United States Patent [19]
Hageman

[11] Patent Number: 5,416,941
[45] Date of Patent: *May 23, 1995

[54] DOCKBOARD HAVING AN IMPROVED RETURN-TO-DOCK-LEVEL MECHANISM

[75] Inventor: Martin P. Hageman, Mequon, Wis.

[73] Assignee: Kelley Company Inc., Milwaukee, Wis.

[*] Notice: The portion of the term of this patent subsequent to Apr. 27, 2010 has been disclaimed.

[21] Appl. No.: 723,804

[22] Filed: Jul. 1, 1991

[51] Int. Cl.$^6$ .............................................. E01D 1/00
[52] U.S. Cl. ................................................ 14/71.7
[58] Field of Search ................... 14/69.5, 71.7; 104/31

[56] References Cited

U.S. PATENT DOCUMENTS

| | | | |
|---|---|---|---|
| 3,170,179 | 2/1965 | Layne | 14/71 |
| 3,201,814 | 8/1965 | LeClear | 14/71 |
| 3,271,801 | 9/1966 | Dieter et al. | |
| 3,699,601 | 10/1972 | Hecker, Jr. et al. | 14/71 |
| 3,967,337 | 7/1976 | Artzberger | 14/71.7 |
| 4,257,136 | 3/1981 | Loblick | 14/71.3 |
| 4,402,100 | 9/1983 | Slusar | 14/71.3 |
| 4,455,703 | 6/1984 | Fromme et al. | 14/71.3 |
| 4,727,613 | 3/1988 | Alten | 14/71.1 |
| 4,922,568 | 5/1990 | Hageman | 14/71.3 |
| 4,937,906 | 7/1990 | Alexander | 14/71.1 |
| 4,955,923 | 9/1990 | Hageman | 14/71.3 X |

*Primary Examiner*—Stephen C. Pellegrino
*Assistant Examiner*—Nancy Mulcare
*Attorney, Agent, or Firm*—Andrus, Sceales, Starke & Sawall

[57] ABSTRACT

A dockboard having an improved return-to-dock-level mechanism. The dockboard includes a ramp having its rear edge hinged to the frame of the dockboard and a lip is hinged to the front edge of the ramp and is movable between a downwardly hanging pendant position and an extended position. The ramp is biased to an upwardly inclined position by a counterbalancing mechanism. A holddown mechanism interconnects the ramp and the frame, and permits downward movement of the ramp but prevents upward movement of the ramp unless released through operation of a release lever. A link is pivoted to the underside of the ramp and an arm pivotally connects the link with the lip. The distal end of the link is located forwardly and below the level of an abutment on the release lever when the ramp is at a downwardly inclined position and the lip is extended. Subsequent movement of the lip from the extended position to the pendant position will move the distal end of the link upwardly to engage the abutment and move the release lever to a disengaged position to enable the counterbalancing mechanism to pivot the ramp upwardly to a position slightly above horizontal, in which position, the distal end will move out of engagement with the abutment so that the release lever will return to its engaged position and prevent further upward movement of the ramp.

12 Claims, 2 Drawing Sheets

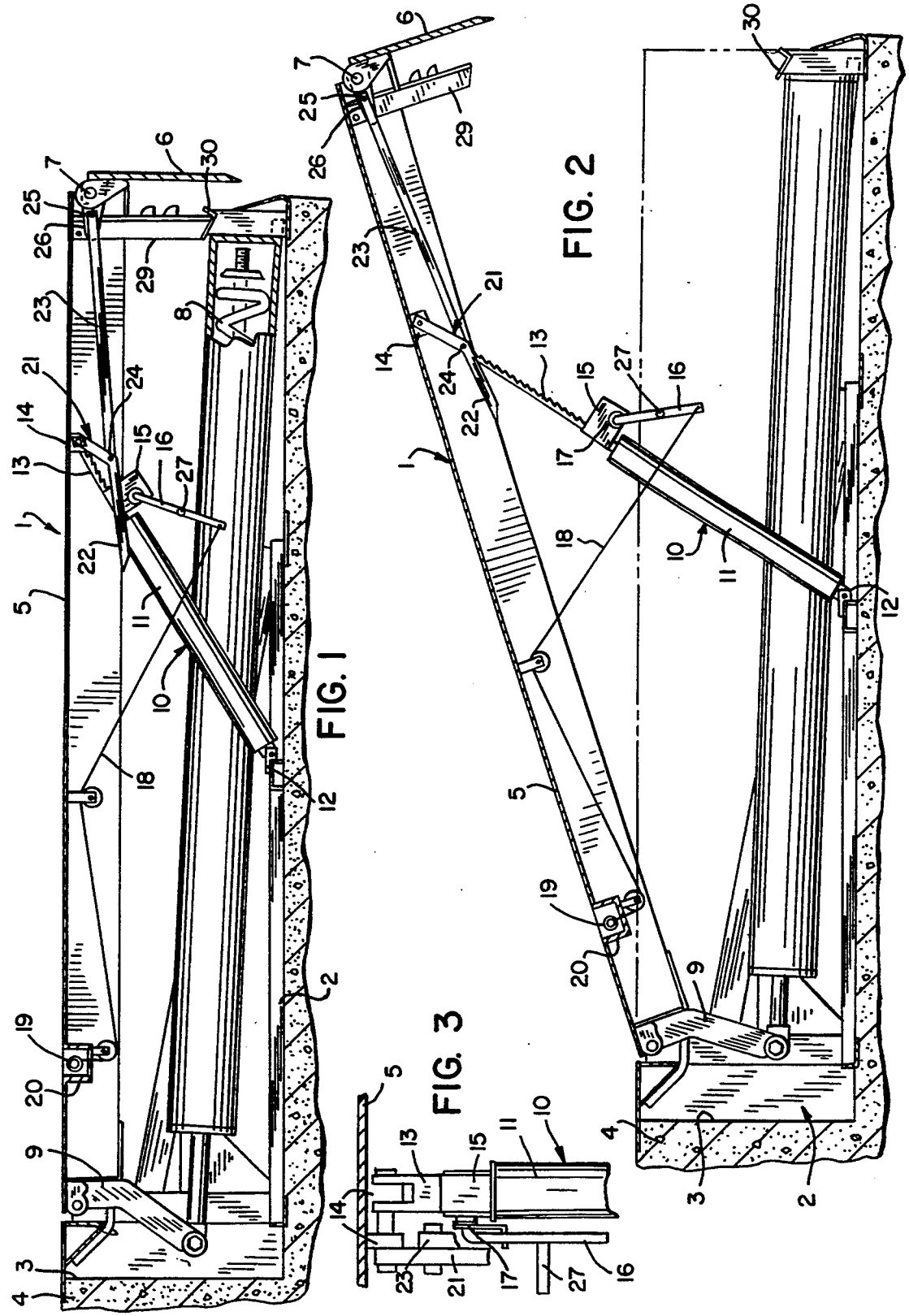

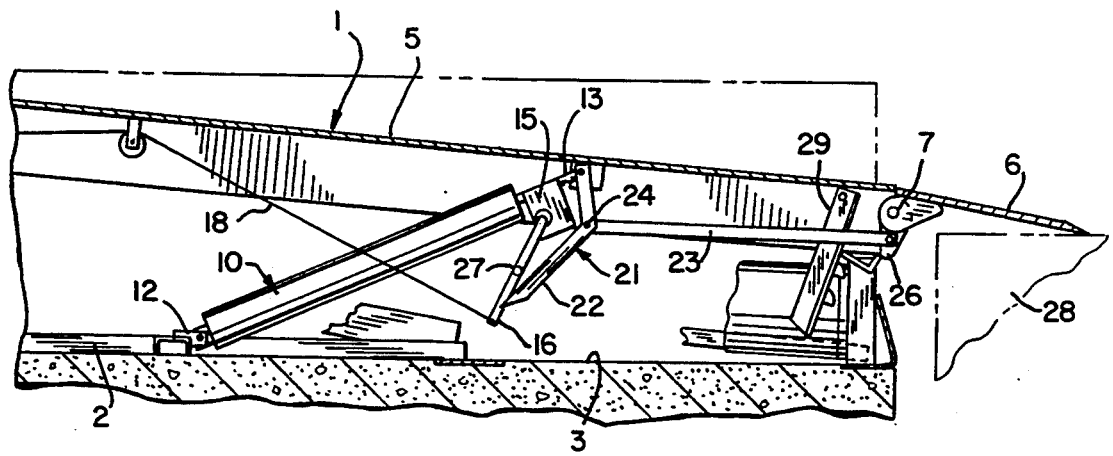
FIG. 5
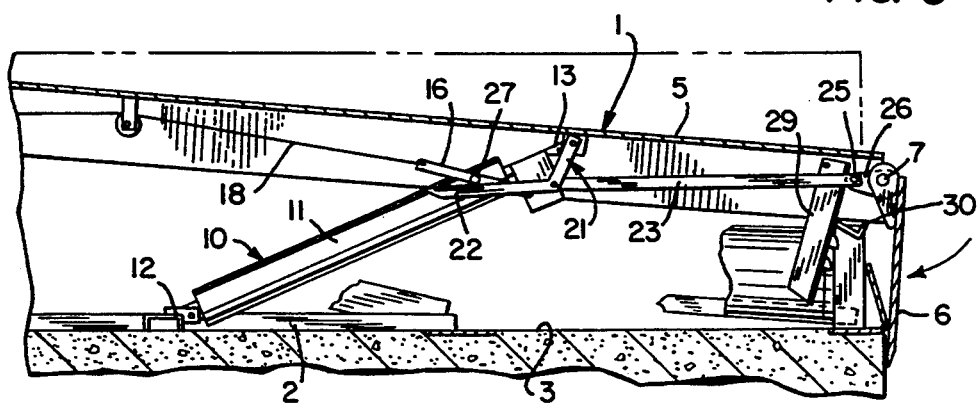
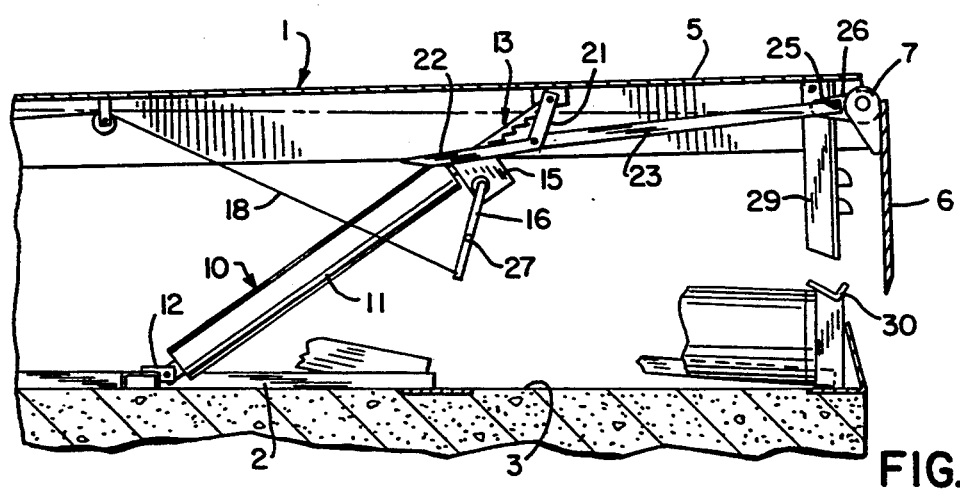
FIG. 6

DOCKBOARD HAVING AN IMPROVED RETURN-TO-DOCK-LEVEL MECHANISM

BACKGROUND OF THE INVENTION

An adjustable dockboard, as shown in U.S. Pat. No. 3,117,332, includes a ramp having its rear end hinged to a loading dock. The ramp is biased upwardly to an inclined position by a counterbalancing spring assembly and a manually releasable holddown mechanism holds the ramp against elevation. Hinged to the front edge of the ramp is an extension lip which is adapted to swing from a downwardly hanging pendant position to an extended position, in which the lip forms an extension to the ramp. The lip, when in the extended position, is adapted to engage the bed of a truck or carrier located in front of the loading dock and bridge the gap between the ramp and the truck bed to enable material handling equipment to move between the dock and the truck bed.

The lip is adapted to be moved from the pendant to the extended position either by upward movement of the ramp when the holddown mechanism is released, or as a consequence of initial downward movement of the ramp from the inclined position toward the horizontal cross traffic position. In either case the engagement of the lip with the bed of the truck releases the weight of the lip from the lip latching mechanism, so that when the truck pulls away from the dock, the lip will automatically fall by gravity to its pendant position.

If the ramp is below dock level, meaning at a downwardly inclined position, when the truck pulls away from the dock, the ramp will remain at this downwardly inclined position unless the holddown is manually released to enable the counterbalancing spring assembly to raise the ramp. With the ramp elevated slightly above a horizontal position, the operator will then walk outwardly on the ramp and the combined weight of the operator and the ramp will overcome the force of the counter-balancing spring to return the ramp to its cross traffic position.

Occasionally the operator may not carry out this procedure to return the ramp to the dock level position, with the result that the ramp remains in the downwardly inclined position. With the ramp in this below dock level position, it can provide an obstruction and a hazard to material handling equipment and personnel moving over the dock.

U.S. Pat. Nos. 3,699,601 and 3,967,337 disclose dockboards having a mechanism which will automatically return the ramp to a dock level position if the ramp is at a below dock level position when the truck pulls away from the dock.

SUMMARY OF THE INVENTION

The invention is directed to a dockboard having an improved return-to-dock level mechanism. The dockboard includes a frame or supporting structure which is mounted within a pit or depression in a loading dock. The rear end of a ramp or deck plate is pivoted to the frame and the ramp is adapted to move between a slightly below horizontal or dock level position to an upwardly inclined position. Biasing means, such as an extension spring, interconnects the frame and the ramp and biases the ramp to the upper inclined position.

Hinged to the forward edge of the ramp is an extension lip which can be moved between a downwardly hanging pendant position and an outwardly extended position where it forms an extension to the ramp.

Interconnecting the frame and the ramp is a holddown mechanism which is constructed to prevent upward movement of the ramp unless released, but permits free downward movement of the ramp. The holddown mechanism includes a pivotable release lever which is biased to an engaged position. The holddown can be manually released by an operator by pulling upward on an operating cable that is connected to the release lever.

The return-to-dock-level mechanism of the invention includes a link which is pivotally connected to the underside of the ramp and preferably has an angle-shaped configuration. An arm pivotally interconnects the link with a lug secured to the underside of the lip. The link is constructed such that when the ramp is in the horizontal or cross-traffic position and the lip is pendant, the distal end of the link will be located above an abutment on the release lever of the holddown mechanism.

After a truck or other carrier has backed up to the loading dock, the release lever of the holddown is manually operated by the dock operator to release the holddown and enable the ramp to pivot upwardly under the influence of the biasing spring to the upper inclined position. The operator then walks outwardly on the ramp and the combined weight of the operator, along with the weight of the ramp, will overcome the biasing affect of the spring to cause the ramp to move downwardly toward a horizontal position. As the ramp pivots downwardly, the lip is pivoted outwardly to the extended position by a conventional lip lifting and latching mechanism.

As the lip is pivoted outwardly, the link will be pivoted forwardly and the extended lip will engage the truck bed. If the truck bed is at a level beneath the level of the dock, the distal end of the link will be located forwardly and below the level of the abutment on the release lever of the holddown mechanism.

After the loading operation has been completed and the truck pulls away from the loading dock, the lip will fall by gravity from the extended to the pendant position, and the pivotal movement of the lip will move the distal end of the link upwardly to engage the abutment on the release lever to move the lever to the disengaged position, thus enabling the biasing spring to move the ramp upwardly. The link is constructed such that upward movement of the ramp to a position slightly above horizontal will cause the distal end to ride out of engagement with the release lever, thereby enabling the release lever to return to its engaged position and engage the holddown to prevent further upward movement of the ramp. The operator can then walk outwardly on the ramp to move the ramp slightly downward to the horizontal position where the cross-traffic legs on the ramp will engage the frame to maintain the ramp in a horizontal position.

The return-to-dock-level mechanism of the invention is of simple and inexpensive construction and can be readily retrofitted to existing dockboards with minimum reconstruction.

The invention provides a smooth return-to-dock-level action and the mechanism can be readily adjusted by changing the location of the pivotal connection between the arm and the lip lug or by changing the length of the distal end of the link.

The mechanism enables end loads to be handled without hindering normal operation and without the necessity of disengaging of any components. End loads refer to loads or cargo which are located at the rear end of the truck bed and prevent the lip from being extended onto the truck bed until the loads are removed.

Other objects and advantages will appear in the course of the following description.

DESCRIPTION OF THE DRAWINGS

The drawings illustrate the best mode presently contemplated for carrying out the invention.

In the drawings:

FIG. 1 is a vertical section of a dockboard incorporating the return-to-dock-level mechanism of the invention with the ramp being shown in the horizontal position and the lip being pendant;

FIG. 2 is a view similar to FIG. 1 showing the ramp in the upwardly inclined position and the lip pendent;

FIG. 3 is a fragmentary enlarged elevational view of the holddown and return-to-dock-level mechanism;

FIG. 4 is a view similar to FIG. 1 showing the ramp in a downwardly inclined position with the lip extended and in engagement with the truck bed;

FIG. 5 is a view similar to FIG. 4, the lip having moved to the pendant position and the holddown being released; and FIG. 6 is a view similar to FIG. 4 showing the ramp in a slightly upwardly inclined position and the holddown being reengaged.

DESCRIPTION OF THE ILLUSTRATED EMBODIMENT

The drawings illustrate a dockboard 1 having a frame or supporting structure 2 that is mounted in a pit or depression 3 of a loading dock 4.

Dockboard 1 includes a ramp or deck plate 5 having its rear edge hinged to frame 2 so that the ramp can be moved between a slightly below horizontal or dock level position to an upwardly inclined position as shown in FIG. 2.

An extension lip 6 is hinged to the forward or front edge of the ramp by a plurality of hinges 7. Hinges 7 are constructed in a manner such that the lip 6 can be moved between a downwardly hanging pendant position, as shown in FIG. 1, to an extended position where the lip forms an extension to the hinge, but the hinge connection prevents movement of lip 6 beyond the extended position, as shown in FIG. 4.

A lip lifting and latching mechanism, not shown, but of the type shown in U.S. Pat. No. 3,997,932, can be incorporated to move the lip from the pendant to the extended position as the ramp is lowered from the inclined position toward the horizontal and to latch the lip in the extended position. When the extended lip engages the bed of the truck located in front of the dock, the weight of the lip will be taken off of the latching mechanism to release the latching mechanism and enable the lip to fall by gravity to the pendant position when the truck pulls away from the loading dock, as described in the above patent.

Ramp 5 is biased to the upwardly inclined position, as shown in FIG. 2, by a counterbalancing mechanism, as disclosed in U.S. Pat. No. 3,528,118. The counterbalancing mechanism includes an extension spring 8, the forward end of which is engaged with frame 2 while the rear end of the spring is connected to the lower end of an arm 9 that is secured to the undersurface of the rear end of ramp 5. The force of spring 8 acting through arm 9 will pivot the ramp upwardly to the inclined position.

A unidirectional holddown mechanism 10, of the type shown in U.S. Pat. No. 3,646,627, interconnects the frame 2 and the undersurface of ramp 5. Holddown mechanism 10 as described in U.S. Pat. No. 3,646,627 includes a tubular housing 11, the lower end of which is pivotally connected to lug 12 on frame 2. A ratchet bar 13 extends outwardly of the upper end of housing 11 and the upper end of the ratchet bar is pivotally connected to lugs 14 which are located on the underside of ramp 5.

The holddown mechanism includes one or more pawls, not shown, located within housing 15 which are engaged with the teeth of the ratchet bar 13. The teeth on the ratchet bar 13 and the pawls are constructed to permit free inward movement of the ratchet bar 13 relative to housing 11 but to prevent outward movement of the ratchet bar unless the pawls are released.

A release lever 16 is mounted on housing 15 and is operably connected to the pawls, as described in U.S. Pat. No. 3,646,627. Lever 16 is biased by torsion spring 17 to an engaged position where the pawls engage the teeth on the ratchet bar. Release lever 16 can be moved to a disengaged position through a manual operation of a pull chain 18. One end of chain 18 is attached to the lower end of the release lever 16 while the opposite end of the chain is attached to a pull ring 19 mounted within a well 20 in ramp 5. By pulling upwardly on pull ring 19, the release lever 16 will be pivoted to a disengaged position to release the holddown mechanism.

The return-to-dock-level mechanism of the invention includes a link 21 which preferably has a generally L-shape and is pivotally connected to lugs 14 on the under side of ramp 5. As shown on the drawings, both the ratchet bar 13 and the link 21 can be pivotally connected to the ramp about the same horizontal pivot axis. Link 21 includes a generally straight distal end 22.

An arm 23 pivotally interconnects link 21 with a lug 26 attached to the underside of lip 6. As shown in the drawings, one end of arm 23 is pivotally connected about a pivot axis 24 to the central portion of L-shaped link 21, while the opposite end of arm 23 is pivotally connected about a pivot 25 to the lip lug 26. Lug 26 can be welded to lip 6 and has a series of holes which provide an adjustment for the pivotal connection between arm 23 and lug 26.

Operation

FIG. 1 shows the dockboard in a horizontal or cross traffic position with the lip 6 in the pendant position. In this position, the distal end 22 of link 21 is located a substantial distance above a pin or abutment 27 that extends laterally from the central portion of release lever 16.

After a truck or other carrier backs to the loading dock, ramp 5 is pivoted upwardly to the position shown in FIG. 2. This is accomplished by the operator pulling upwardly on chain 18 which will release holddown 10 and enable the ramp to pivot upwardly under the influence of the counterbalancing spring 8.

With the ramp in the inclined position, the operator then walks outwardly on the inclined ramp 5 and the weight of the operator in combination with the weight of the ramp will overcome the force of spring 8 causing the ramp to move downwardly toward the horizontal position. As the ramp moves downwardly, the lip lifting and latching mechanism will move the lip 6 to the extended position and latch the lip in that position.

The ramp is walked downwardly until the extended lip 6 engages the bed of a truck or carrier 28 parked in front of the loading dock. FIG. 4 shows a situation where the bed of the carrier 28 is at a level beneath dock level so that the ramp is at a slightly downwardly inclined position. In this position, the distal end 22 of link 21 is located forwardly and beneath the level of the abutment 27.

After the loading operation has been completed, the truck may pull away from the loading dock and the lip 6 will pivot downwardly by gravity to the pendant position as shown in FIG. 5. Downward movement of the lip 6 will pivot the distal end 22 of link 21 upwardly, as seen in FIG. 5, to engage abutment 27 and thereby pivot the release lever 16 to the release position. This action will release the holddown 10 and enable the ramp 5 to pivot upwardly under the influence of the counterbalancing spring 8. As the ramp pivots upwardly, the distal end 22 of link 21 will ride along the abutment 27 and when the end 22 clears the abutment, release lever 16 will move back to its engaged position under the influence of spring 17 to reengage the holddown and prevent further upward movement of the ramp. The mechanism is designed such that the distal end 22 will clear the abutment 27 when the ramp 5 is just slightly above a horizontal position. The operator will then walk outwardly on the ramp, moving the ramp downwardly to the horizontal position where the cross traffic legs 29 on the ramp will engage the supports 30 on frame 2 to maintain the ramp in the horizontal position.

If, during the loading operation, the bed of carrier 28 is located flush with the dock or above dock level, the distal end 22 of link 21 will be located above abutment 27 so that as the lip pivots back to its pendant position when the truck pulls away from the loading dock, distal end 22 will not engage abutment 27 and there will be no release of holddown 10. Thus, the return-to-dock-level mechanism of the invention will only come into play when the ramp is at a below dock level position as the lip 6 falls to its pendant position.

The mechanism of the invention also enables end loads on the carrier bed 28 to be handled without hindering normal operation and without the necessity of disengagement of any components. End loads are those loads or cargo which are located on the rear end of the truck bed and prevent the lip from being extended onto the truck bed. In normal operation, the end loads must be removed before the dockboard can be operated in a manner in which the lip is extended onto the truck bed. If the truck bed is below dock level, the operator will initially release the holddown 10 and permit the ramp 5 to pivot upwardly several inches to elevate the cross traffic legs 29 from the supports 30 on the frame. The operator then retracts the cross traffic legs 29 through a conventional manual cable mechanism (not shown), and with the cross traffic legs retracted, the operator walks the ramp down to a downwardly inclined position to enable a fork lift truck to remove the end loads. With the end loads removed, the dockboard can be operated in the normal manner to remove the remaining cargo.

When using the above procedure to remove end loads, the distal end 22 of link 21 will at all times be above abutment 27 on release lever 16, so that the release lever will not be actuated or disengaged by link 21 during the end load removal procedure. Thus, the invention will not interfere with normal end load operation and will only come into play when the ramp is moved to its fully upwardly inclined position, as shown in FIG. 2.

The invention provides a smooth operating, inexpensive, effective mechanism for automatically returning the ramp of the dockboard from a below-dock-level position to a horizontal or cross traffic position, without hindering below-dock-level end loading.

Various modes of carrying out the invention are contemplated as being within the scope of the following claims particularly pointing out and distinctly claiming the subject matter which is regarded as the invention.

I claim:

1. A dockboard having an improved return-to-dock-level mechanism, comprising a supporting structure secured to a loading dock, a ramp having a rear edge pivotally connected to the supporting structure and movable between a downwardly inclined position to an upwardly inclined position, a lip hinged to a forward end of the ramp and movable between a downwardly hanging pendant position and an extended position where the lip forms an extension to said ramp, biasing means urging the ramp to the upwardly inclined position, holddown means interconnecting the ramp and the supporting structure and including a release lever having an engaged position and a disengaged position, said holddown means being constructed and arranged to permit free downward movement of the ramp but prevent upward movement of the ramp unless released, a link having a first end pivotally connected to the ramp and having a distal end, connecting means pivotally interconnecting said link and said lip, an abutment connected to said release lever, said link being disposed above the abutment when said ramp is in a horizontal position and said lip is in the pendant position, said link being disposed to pivot forwardly as the ramp is elevated and the lip moves to the extended position, said link being located forwardly and below said abutment when said ramp is moved downwardly from said upwardly inclined position to said downwardly inclined position and said lip is in the extended position, wherein movement of the lip from the extended position to the pendant position moves the distal end of said link upwardly engaging the abutment on said release lever and moving said release lever to said disengaged position thus releasing said holddown means and enabling said ramp to pivot upwardly under the force of said biasing means, said link being constructed and arranged such that upward pivotal movement of said ramp to a position slightly above horizontal will move said distal end out of engagement with said release lever to re-engage said holddown means.

2. The dockboard of claim 1, and including manually operable means connected to said release lever for manually releasing said holddown means.

3. The dockboard of claim 1, and including second biasing means biasing said release lever to said engaged position.

4. The dockboard of claim 1, and including a lug connected to the underside of said lip, said connecting means being connected to said lug.

5. The dockboard of claim 1, wherein said link is generally angle-shaped.

6. The dockboard of claim 1, wherein said abutment extends laterally from said release lever.

7. The dockboard of claim 1, wherein said first end of said link is pivotally connected to said ramp about a horizontal axis, one end of said holddown means also being pivotally connected to said horizontal axis.

8. A dockboard having an improved return-to-dock-level mechanism, comprising a supporting structure secured to a loading dock, a ramp having a rear edge pivotally connected to the supporting structure and movable between a downwardly inclined position to an upwardly inclined position, a lip hinged to a forward end of the ramp and movable between a downwardly hanging pendant position and an extended position where the lip forms an extension to said ramp, biasing means urging the ramp to the upwardly inclined position, holddown means interconnecting the ramp and the supporting structure and including a release lever having an engaged position and a released position, said release lever when in the engaged position permitting free downward movement of the ramp but preventing upward movement of the ramp unless released, a link having a first end pivotally connected to the ramp and having a distal end, an arm pivotally interconnecting said link and said lip, manually operable means connected to said release lever for manually moving the release lever from the engaged position to the released position, an abutment projecting laterally from said release lever, said distal end being disposed above said abutment when said ramp is in a horizontal position and said lip is in the pendant position, movement of the ramp from the horizontal position to the upwardly inclined position and movement of the lip from the pendant position to the extended position pivoting said link forwardly, downward movement of the ramp from the upwardly inclined position to said downwardly inclined position with said lip in the extended position moving said distal end to a position forward of and beneath said abutment wherein downward movement of said lip from said extended position to the pendant position moves said distal end upwardly into engagement witch the abutment on said release lever and moves said release lever to the disengaged position thus releasing said holddown means and enabling said ramp to be pivoted upwardly by said biasing means, said link being constructed and arranged such that upward movement of the ramp to a position slightly above horizontal will move said distal end out of engagement with said abutment to thereby re-engage said holddown means.

9. A dockboard having an improved return-to-dock-level mechanism, included a supporting structure secured to a loading dock, a ramp having a rear edge pivotally connected to the supporting structure and movable between a downwardly inclined position to an upwardly inclined position, a lip hinged to a forward end of the ramp and movable between a downwardly hanging pendant position and an extended position where the lip forms an extension to said ramp, biasing means urging the ramp to the upwardly inclined position, a holddown interconnecting the ramp and the supporting structure and including a release lever having an engaged position and a released position, said holddown being constructed and arranged to permit free downward movement of the ramp and prevent upward movement of the ramp when said release lever is in the engaged position, a link having one end pivotally connected to the ramp and having a distal end portion, said link being constructed and arranged such that said distal end portion is disposed out of contact with said release lever when said ramp is at said downwardly inclined position and said lip is in the extended position, and means responsive to movement of lip from the extended position to the pendant position when said ramp is at said downwardly inclined position for pivoting the link and moving said distal end portion into engagement with said release lever to thereby move said release lever from the engaged position to the released position and release said holddown means and permit said ramp to pivot upwardly through action of said biasing means.

10. The dockboard of claim 9, and including means responsive to upward movement of the ramp from said downwardly inclined position to a position slightly above horizontal for disengaging said distal end portion from said release lever and re-engaging said holddown means.

11. The dockboard of claim 9, wherein said means responsive to movement of the lip from the extended position to the pendant position comprises a connecting arm having one end pivotally connected to the lip and the opposite end pivotally connected to said link at a location spaced from the pivotal connection of said link to said ramp.

12. The dockboard of claim 9, wherein said distal end portion is substantially free of surface deviations to enable said distal end to freely ride on said abutment.

* * * * *

UNITED STATES PATENT AND TRADEMARK OFFICE
CERTIFICATE OF CORRECTION

PATENT NO. : 5,416,941
DATED : May 23, 1995
INVENTOR(S) : Martin P. Hageman

It is certified that error appears in the above-identified patent and that said Letters Patent is hereby corrected as shown below:

Column 7, line 35, "witch" should be --with--

Signed and Sealed this

Twenty-sixth Day of September, 1995

Attest:

BRUCE LEHMAN

Attesting Officer

Commissioner of Patents and Trademarks